Oct. 15, 1940.   W. O. MAURER   2,218,046
FISHHOOK
Filed May 13, 1938   2 Sheets-Sheet 1
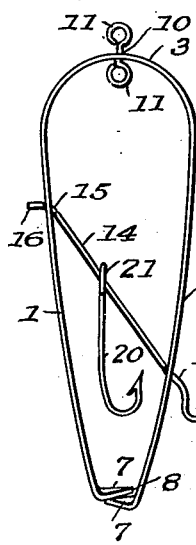 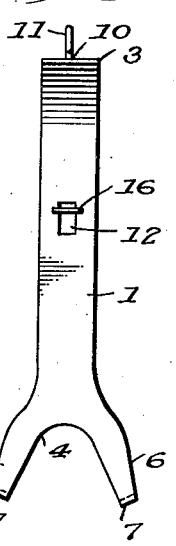 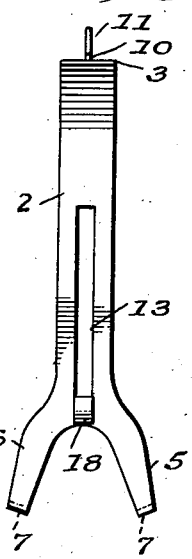 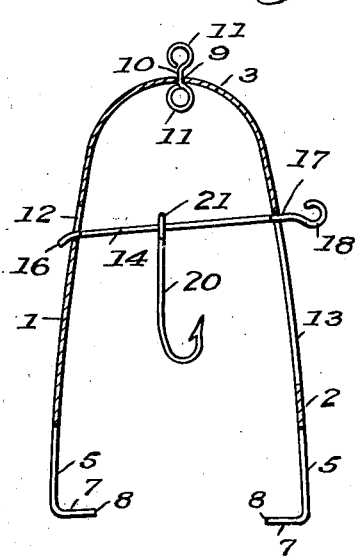
Fig. 1.   Fig. 2.   Fig. 3.   Fig. 4.
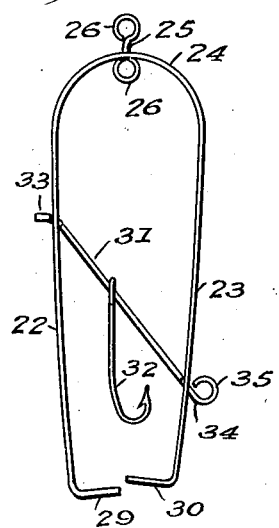 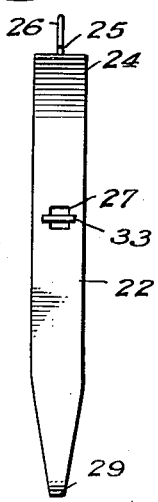 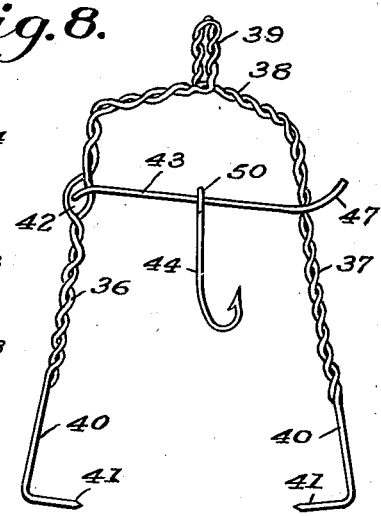
Fig. 6.   Fig. 7.   Fig. 8.
Fig. 9.
Fig. 5.   Fig. 10.
Inventor
WILLIAM O. MAURER.
By
Milans & Milans
Attorneys Oct. 15, 1940.  W. O. MAURER  2,218,046
FISHHOOK
Filed May 13, 1938  2 Sheets-Sheet 2
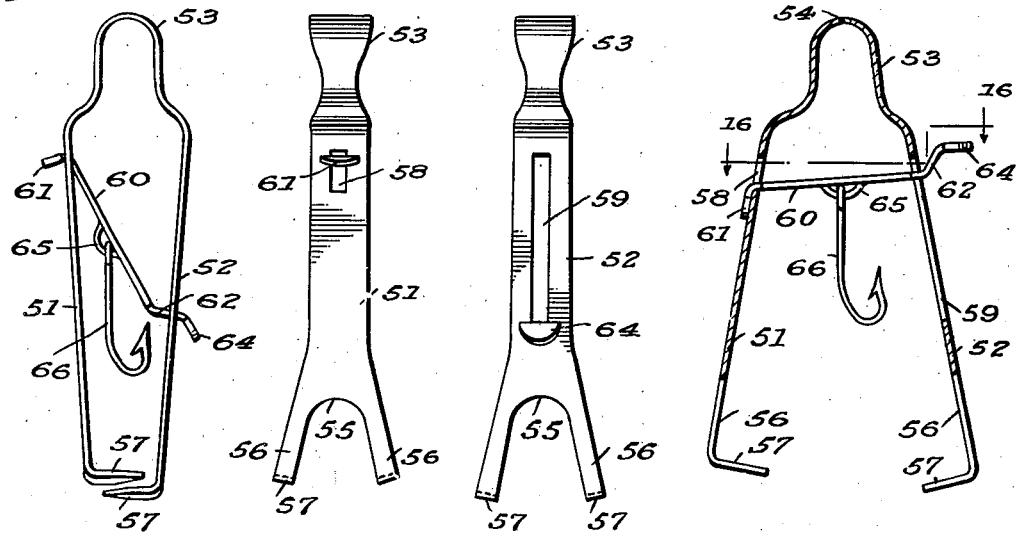
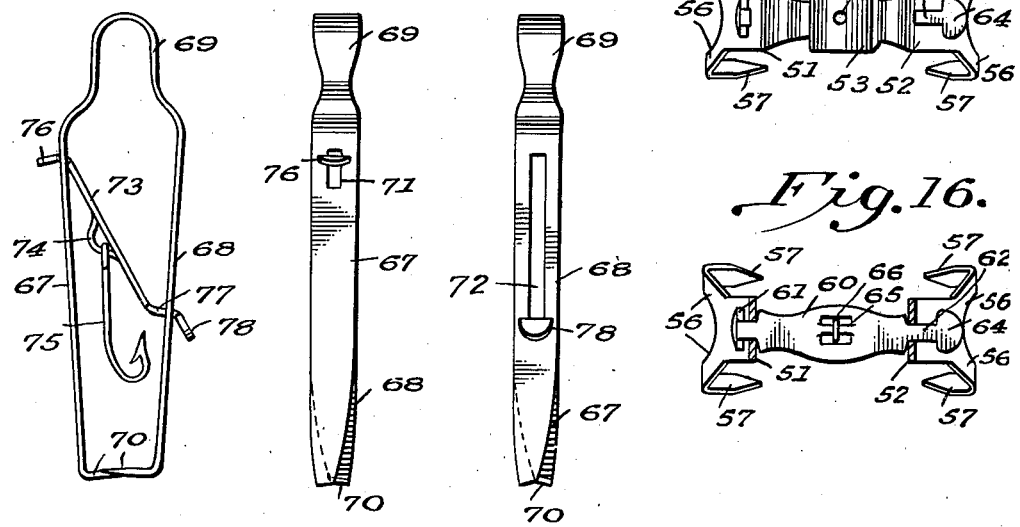
Inventor
WILLIAM O. MAURER.
Milans & Milans
Attorneys Patented Oct. 15, 1940

2,218,046

UNITED STATES PATENT OFFICE 2,218,046

FISHHOOK

William O. Maurer, Cincinnati, Ohio, assignor to George H. Hutaff, Jr., Wilmington, N. C.

Application May 13, 1938, Serial No. 207,817

8 Claims. (Cl. 43—36)

My invention relates to new and useful improvements in fishhooks and the principal object of the invention resides in the formation of a fishhook with oppositely disposed spring gripping arms or jaws connected at their upper ends and formed at their lower ends with an inwardly directed prong or projection, the lower ends of the arms or jaws being normally urged inwardly or towards one another but adapted to be forced into open or spaced relation by a spacing bar or trip and so held until released by a pull on the bait hook carried by the bar or trip.

Another object of the invention consists in the provision of a novel form of spacing bar or trip connected to one of the arms or jaws and slidable relative to the other arm or jaw, the arm or jaw to which the bar or trip is connected being formed with an opening to receive an end portion of the bar or trip, the opposite end of the bar or trip being associated with the opposite arm or jaw to permit, as stated, sliding movement relative thereto.

A further object of the invention resides in the provision of a novel form of spacing bar or trip connected to one of the arms or jaws and slidable relative to the other arm or jaw, the arm or jaw to which the bar or trip is connected being formed with an opening to receive an end portion of the bar or trip whereas the other arm or jaw is formed with an elongated opening through which the opposite end of the bar or trip projects, the bar or trip being positioned at an angle between the arms or jaws when the arms or jaws are in closed or gripping position but adapted to be raised to substantially horizontal position for spacing the arms or jaws and holding them in open position.

Still another object of the invention consists in forming oppositely disposed spring arms or jaws from a continuous strip of material and bending the same to provide an upper connecting portion, the lower end of each arm or jaw being formed with an inwardly directed prong or projection, the resiliency of the arms or jaws and connecting upper portion normally holding the arms or jaws with their lower ends in close relation, means being provided for spacing the arms or jaws and holding them in such spaced relation, this spacing or holding means having a bait hook connected thereto, a pull on the bait hook releasing the spacing member to permit the arms or jaws to assume their normally closed position.

A further object of the invention resides in the provision of oppositely disposed spring gripping arms or jaws normally held in closed position, and a member adapted for spacing said arms or jaws and holding them in such spaced relation, the member being formed of a flat strip of material formed at its ends to provide means for positioning the same relative to the arms or jaws, and intermediate the ends to have connected thereto, for swinging movement, a bait hook.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a face view showing the spring arms or jaws in closed position.

Fig. 2 is an edge view looking from one side of the device.

Fig. 3 is an edge view looking from the opposite side of the device.

Fig. 4 is a transverse vertical section, with parts shown in elevation, and the spring arms or jaws in open or spaced position.

Fig. 5 is a detail showing a plan of the spacing bar or trip.

Fig. 6 is a view similar to Fig. 1 showing a slightly modified form of the invention.

Fig. 7 is a view similar to Fig. 2 of the modified form of the invention shown in Fig. 6.

Fig. 8 is a view similar to Fig. 3 of the modified form of the invention shown in Fig. 6.

Fig. 9 is a face view of a further modified form of the invention with the spring arms or jaws shown in spaced or open position.

Fig. 10 is a detail showing a plan of the spacing bar or trip disclosed in Fig. 9.

Fig. 11 is a face view similar to Figs. 1 and 6 of the drawings illustrating a still further modified form of my invention.

Fig. 12 is an edge view of the device looking from one side.

Fig. 13 is an edge view of the device looking from the opposite side.

Fig. 14 is a transverse vertical section, with parts shown in elevation, illustrating the spring jaws or arms in spaced or open position.

Fig. 15 is a top plan of the construction shown in Figs. 11 to 14 inclusive with the spring arms or jaws in spaced or open position.

Fig. 16 is a horizontal section on the line 16—16 of Fig. 14.

Fig. 17 is a face view of a slightly modified form of the invention disclosed in Figs. 11 to 16 inclusive of the drawings.

Fig. 18 is an edge view looking in one direction of the construction shown in Fig. 17; and Fig. 19 is an edge view of the construction shown in Fig. 17 looking in the opposite direction.

In each form of the invention a continuous strip of material is used for forming the spring gripping arms or jaws, the strip being folded intermediate its ends to provide the oppositely disposed spring arms or jaws and a connecting portion. In each form of the invention, with the exception of that disclosed in Fig. 9, the continuous strip is of sheet metal of the desired width folded in the manner described.

In that form of the invention disclosed in Figs. 1 to 5 inclusive of the drawings a continuous strip of sheet metal is folded to provide the oppositely disposed spring gripping arms or jaws 1 and 2 and the connecting portion 3, the arms extending parallel as shown and the lower end of each arm or jaw being forked as shown at 4 to provide the extensions 5 and 6, the ends of which are bent inwardly to provide the prongs 7 which are preferably pointed as shown at 8. The connecting portion 3 is formed with an opening 9 through which extends the rod 10 provided at each end with an eye 11, the upper eye being adapted to receive the end of a fishing line which is secured thereto. The rod 10 and associated eyes 11 will act as a swivel to prevent tangling of the line and permitting rotation of the complete device relative to the line.

The arm or jaw 1 is formed with the relatively short elongated opening 12 whereas the arm 2 is provided with the relatively long elongated opening 13, as shown more particularly in Fig. 3 of the drawings.

Positioned between the arms or jaws 1 and 2 is a bar or strip 14 of the shape shown more particularly in Fig. 5 of the drawings. This bar or trip is formed, adjacent one edge, with the notches 15 which form the enlarged head portion 16 which is adapted to be positioned through the opening 12 in the arm 1, the notches 15 receiving the edges of the opening 12 whereas the enlarged head 16 engages the outer face of the arm or jaw. The opposite end of the bar or trip 14 is formed with the reduced extension 17 which is adapted to extend through the relatively long elongated opening 13 in the arm 2 and the end of this reduced extension 17 is coiled to provide the eye 18, this coil or eye providing a finger-engaging portion for raising the bar or trip into the substantially horizontal position shown in Fig. 4 of the drawings. The bar or trip 14 is provided, intermediate its ends, adjacent the longitudinal edges, with the openings 19 and a bait hook 20 will be carried by the bar or trip with its eye portion 21 received in one of the openings 19, as shown.

Normally the spacing bar or trip 14 will be in the position shown in Fig. 1 of the drawings, extending at an angle between the oppositely disposed arms or jaws 1 and 2. The resiliency of the arms or jaws and the connecting portion 3 tends to hold the lower ends of the arms or jaws in the closed position shown. When it is desired to use the device the coiled or eye portion 18 will be engaged and pushed upwardly to position the bar or trip as shown in Fig. 4. When thus positioned the spring jaws or arms are held in spaced or open position as shown in Fig. 4. Bait will be positioned on the bait hook 20 and when the bait is snapped by the fish and a pull is placed on the hook 20 it will lower the bar or trip into its original position shown in Fig. 1 and allow the jaws or arms to spring into closed position and engage the fish.

In Figs. 6 to 8 inclusive of the drawings I have shown a slightly modified form of my invention, the only difference from that disclosed in Figs. 1 to 5 inclusive being that the lower ends of the spring arms or jaws are not forked. Instead there is but a single extension on the ends of the arms and but a single inwardly directed prong or projection formed on each arm or jaw. In this modified form of the invention the oppositely disposed spring arms or jaws are indicated at 22 and 23 and are connected by the portion 24 having an opening through which extends a rod 25 having the eye 26 on opposite ends. The arm or jaw 22 is formed with the opening 27 whereas the arm 23 is formed with the elongated opening 28. The lower end of the arm or jaw 22 is provided with the inwardly directed prong or projection 29 whereas the arm or jaw is provided with the corresponding inwardly extending prong or projection 30. Positioned between the oppositely disposed arms or jaws 22 and 23 is the spacing bar or trip 31 of the same construction as disclosed in Fig. 5 of the drawings with the bait hook 32 carried thereby. As in the construction shown in Fig. 5 of the drawings the bar or trip 31 has the head portion 33 extending through the opening 27 of the arm or jaw 22 and the opposite end is formed with the reduced extension 34 which passes through the elongated opening 28 in the arm or jaw 23 and has its outer end coiled to provide an eye as shown at 35. Normally the oppositely disposed jaws will be in the closed position shown in Fig. 6 but when it is desired to use the hook the eye or coiled portion 35 will be engaged and the bar or trip will be raised into a substantially horizontal position, as is shown in Fig. 4 of the drawings, to space or open the arms or jaws.

In Figs. 9 and 10 of the drawings I have shown a still further modified form of my invention in which the spring gripping arms or jaws are formed of wire. In this form of the invention two strips of wire are twisted together to form the oppositely disposed spring arms 36 and 37 with the connecting portion 38 and eye 39. The lower ends of these wire strips are not twisted together but form the extensions 40 on each of which is provided an inwardly directed pointed extension 41. The twisted portion of the arm 36 is formed with an eye 42 to which is connected one end of a spacing bar or trip 43 which carries the bait hook 44. The spacing bar or trip 43 is formed, adjacent one end, with an opening 45 having the slit 46 extending to one edge as shown more particularly in Fig. 10 of the drawings. Through means of the slit the end of the bar or trip 43 may be engaged with the eye 42 with a strand of wire received in the opening 45. The opposite end of the bar or trip is bent upwardly as shown at 47 to provide a finger-engaging portion and adjacent this bent-up end the bar or trip is formed with the elongated opening 48 through which extends the spring arm or jaw 37. The bar or trip 43 is formed, adjacent each longitudinal edge, intermediate the ends, with an opening 49, in one of which openings is received the eye portion 50 of the bait hook 44.

In this modified form of the invention the operation is the same as set forth in connection with the forms disclosed in Figs. 1 to 8 inclusive. Normally the lower or free ends of the arms or jaws 36 and 37 are in closed position with the bar or trip 43 extending at an angle between the arms or jaws. When the hook is to be used the bent portion 47 of the bar or trip is engaged and the bar is raised into the substantially horizontal position shown in Fig. 9. It will be understood, as previously described, that when a pull is placed on the bait hook 44 the bar or trip will be lowered to permit the oppositely disposed spring arms or jaws to spring inwardly to engage the fish.

In Figs. 11 to 16 inclusive of the drawings I have illustrated a still further modified form of the invention as disclosed in Figs. 1 to 5 inclusive. The modification illustrated in Figs. 11 to 16 inclusive of the drawings is formed from a strip of material bent or folded to provide the oppositely disposed spring gripping arms or jaws indicated at 51 and 52 connected at their upper ends by the portion 53 which, as shown more particularly in Figs. 11 and 14 of the drawings, is of less width than the space between the arms or jaws 51 and 52. This connecting portion 53 forms a fingergrip and is provided in its top with an opening 54 through which the line may be connected or in which may be positioned a line connecting member of the character disclosed in Figs. 1 to 8 of the drawings. The lower end of each of the arms or jaws 51 and 52 is forked as shown at 55 to provide the extensions 56, each of the extensions having an inwardly directed prong or projection 57 which, when the arms or jaws are in their closed position will overlap as shown more particularly in Fig. 11 of the drawings.

The arm 51 is formed with the short elongated opening 58 whereas the arm or jaw 52 is formed with the relatively long elongated opening 59.

For spacing or opening the arms or jaws 51 and 52 I provide the spacing bar or trip which is indicated at 60. This bar or trip is formed on one end with the enlarged head portion 61 which is positioned through the opening 58 whereas the opposite end of the bar or trip is reduced as shown at 62, this reduced portion extending through the relatively long elongated opening 59. On the end of the reduced portion 62 is formed the enlarged finger-engaging portion 64. Intermediate its ends the bar or trip 60 is formed with the struck-out depending eye portion 65 to which is connected the bait hook 66.

Normally the bar or trip 60 extends at an angle, as shown more particularly in Fig. 11 of the drawings, and when in this position the spring gripping arms or jaws will be in what might be termed their closed position. When it is desired to use the hook bait will be placed on the bait hook 66 and the enlarged portion 64 of the bar or trip will be engaged to raise that end of the bar or trip and position the same in the substantially horizontal position shown more particularly in Fig. 14 of the drawings. When in this position the spring arms or jaws 51 and 52 will be held in their open or spaced positions. It will be noted that the enlarged head 61 will extend parallel with the arm or jaw 51. When a fish engages the bait on the bait hook 66 and pulls thereon the bar or trip will be released and the spring gripping jaws 51 and 52 will spring into their closed position to engage the fish.

In Figs. 17 to 19 inclusive of the drawings I have shown a slightly modified form of the invention disclosed in Figs. 11 to 16 inclusive of the drawings. This modified form of the invention, disclosed in Figs. 17 to 19 inclusive, is similar to that disclosed in Figs. 11 to 16 inclusive with the exception that the lower ends of the spring gripping arms or jaws are not forked and there is but a single prong or projection on the lower end of each of the arms or jaws. In this modified form of the invention the spring gripping jaws or arms are indicated at 67 and 68 and are connected by the portion 69 of less width than the space between the oppositely disposed arms or jaws. The lower end of each of the arms or jaws is formed with the inwardly extending prong or projection 70 which normally will overlap as shown more particularly in Fig. 17 of the drawings. In this modified form of the invention the arm or jaw 67 is formed with the relatively short elongated opening 71 as shown more particularly in Fig. 18 of the drawings whereas the arm or jaw 68 is formed with the relatively long elongated opening 72 as shown more particularly in Fig. 19. For spacing the arms or jaws in open position I provide the bar or trip 73 which is formed intermediate its ends with the struck-out eye portion 74, similar to the eye portion 65 shown in Figs. 11, 14 and 16 and to which the bait hook 75 is connected. One end of the bar or trip 73 passes through the relatively short elongated opening 71 and is provided with the enlarged head 76 which engages the outer face of the arm or jaw 67. The opposite end of the bar or trip 73 is reduced as shown at 77 and extends through the relatively long elongated opening 72 in the arm or jaw 68. On the end of the reduced extension 77 is an enlarged head portion 78 which provides a finger-engaging portion for raising the bar or trip into substantially horizontal position to space the arms or jaws into open position. The operation is the same as set forth in connection with Figs. 11 and 16 inclusive of the drawings.

Having fully described my invention what I claim as new and desire to secure by Letters Patent is:

1. A fishhook of the character described including oppositely disposed spring arms normally held in closed position, and means for spacing or opening the arms, said means including a bar of sheet material having one end connected to one of the arms for swinging movement relative thereto and the opposite end extending through and movable relative to the other arm.

2. A fishhook of the character described including oppositely disposed spring arms normally held in closed position, one of said arms having an elongated opening therein, and means for spacing or opening the arms, said means including a bar having one end connected to one of the arms and the opposite end extending through the elongated opening in the other arm and adapted for sliding movement therein.

3. A fishhook of the character described including oppositely disposed spring arms normally held in closed position, one of said arms having an elongated opening therein, and means for spacing or opening the arms, said means including a bar having one end connected to one of the arms and the opposite end extending through and operable in the elongated opening in the other arm, said spacing member normally extending at an angle between the arms when the arms are in closed position and adapted to be raised into substantially horizontal position for spacing or opening the arms.

4. A fishhook of the character described including oppositely disposed spring arms normally held in closed position, one of said arms having a relatively short opening therein and the opposite arm being provided with a relatively long elongated opening, a spacing bar having one end engageable through the relatively short opening of the one arm and the opposite end extending through and operable in the relatively long elongated opening of the other arm, and a bait hook carried by the spacing bar.

5. A fishhook of the character described including oppositely disposed spring arms normally held in closed position, one of said arms having a relatively short opening therein and the opposite arm being provided with a relatively long elongated opening, a spacing bar having an enlarged head on one end engageable through the relatively short opening of the one arm and the opposite end extending through and operable in the relatively long elongated opening of the other arm, that end of the bar extending through the relatively long elongated opening being formed to provide a finger-engaging portion, and a bait hook connected to and carried by the spacing bar.

6. A fishhook of the character described including oppositely disposed spring arms normally held in closed position, and a spacing bar operable between and engageable with the spring arms for opening or spacing the same, said bar having an opening intermediate the ends thereof, and a bait hook having a portion extending through the opening in the bar and depending therefrom.

7. A fishhook of the character described including oppositely disposed spring arms normally held in closed position, one of said arms having a relatively short opening therein while the other arm is provided with a relatively long elongated opening, a spacing bar positioned between the spring arms, one end of said bar having a headed portion engageable through the relatively short opening in the one arm while the opposite end extends through and is operable in the relatively long elongated opening of the other arm, the spacing bar having an opening intermediate its ends, and a bait hook having a portion engageable in the opening of the spacing bar.

8. A fishhook of the character described including oppositely disposed spring arms normally held in closed position, one of said arms having a relatively short opening therein while the opposite arm is provided with a relatively long elongated opening, and a spacing bar positioned between the arms and operable to space or open the same, one end of said bar being engageable through the relatively short opening of the one arm while the opposite end extends through and is operable in the relatively long elongated opening of the other arm, the bar having a struck-out portion intermediate its ends to form a depending eye, and a bait hook connected to the depending eye of the spacing bar.

WILLIAM O. MAURER.